No. 791,588. PATENTED JUNE 6, 1905.
R. STITTS.
BARBER'S CHAIR.
APPLICATION FILED JUNE 22, 1904.

6 SHEETS—SHEET 1.

WITNESSES:
W. F. Doyle.
Bernard Spohn.

INVENTOR
Robert Stitts
BY
Watson E. Coleman
Attorney

No. 791,588. PATENTED JUNE 6, 1905.
R. STITTS.
BARBER'S CHAIR.
APPLICATION FILED JUNE 22, 1904.

6 SHEETS—SHEET 3.

No. 791,588. PATENTED JUNE 6, 1905.
R. STITTS.
BARBER'S CHAIR.
APPLICATION FILED JUNE 22, 1904.

6 SHEETS—SHEET 4.

WITNESSES:
W. F. Doyle
Bernard Spohn

INVENTOR
Robert Stitts
BY
Watson E. Coleman
Attorney

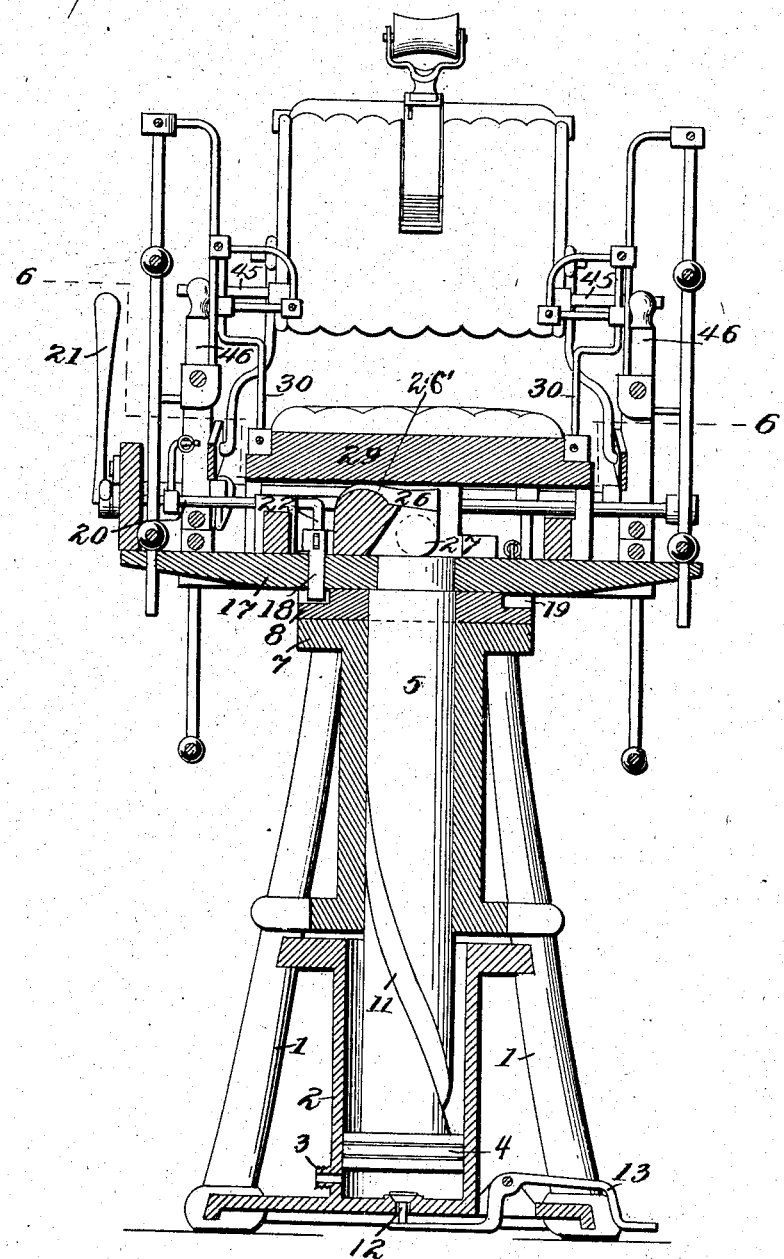

No. 791,588. PATENTED JUNE 6, 1905.
R. STITTS.
BARBER'S CHAIR.
APPLICATION FILED JUNE 22, 1904.
6 SHEETS—SHEET 6.
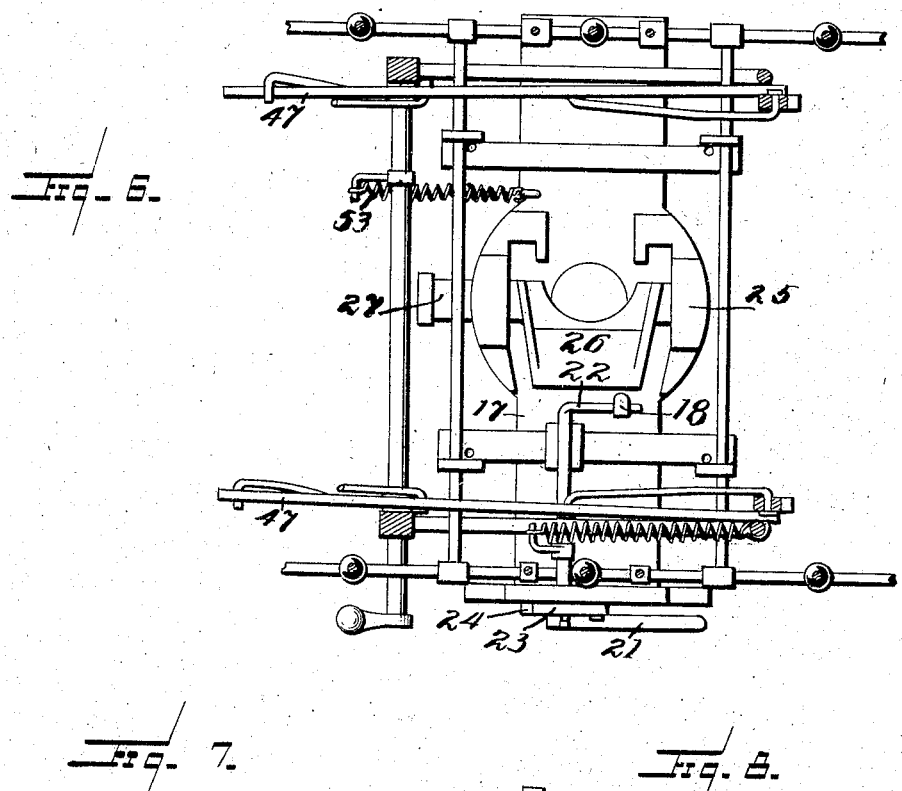
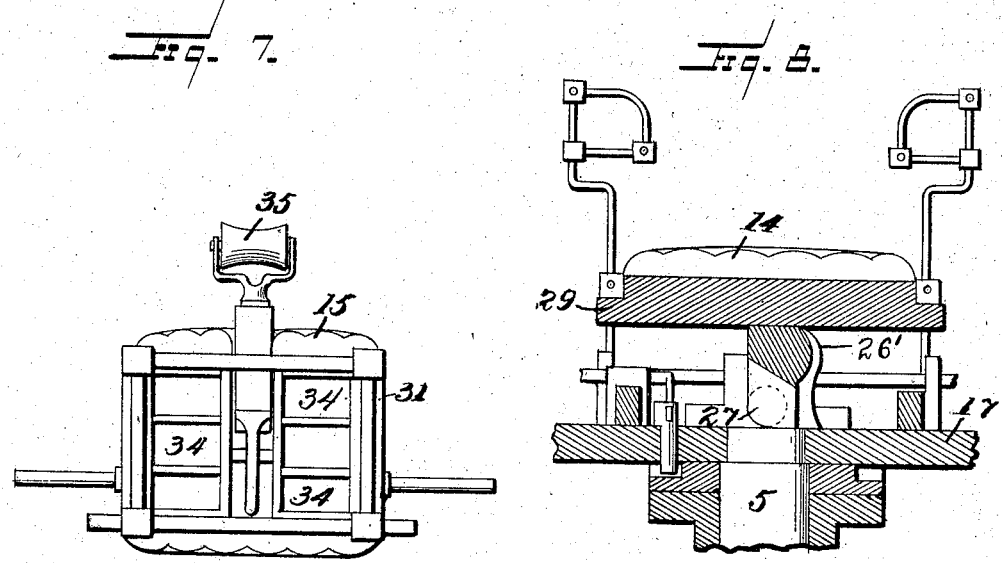
WITNESSES:
INVENTOR
Robert Stitts
BY
Watson E. Coleman
Attorney No. 791,588.

Patented June 6, 1905.

UNITED STATES PATENT OFFICE.

ROBERT STITTS, OF DAWSON, TERRITORY OF NEW MEXICO.

BARBER'S CHAIR.

SPECIFICATION forming part of Letters Patent No. 791,588, dated June 6, 1905.

Application filed June 22, 1904. Serial No. 213,635.

*To all whom it may concern:*

Be it known that I, ROBERT STITTS, a citizen of the United States, residing at Dawson, in the county of Colfax and Territory of New Mexico, have invented certain new and useful Improvements in Barbers' Chairs, of which the following is a specification, reference being had therein to the accompanying drawings.

My invention relates to barber-chairs, and has for its object material improvements in means for effecting the adjustment of the same to accommodate customers of varying size and to attain the positions desired for cutting hair, shaving, shampooing, &c.

The details of construction by means of which I accomplish the desired results are set out in full in the specification and claims and are illustrated in the accompanying drawings, in which—

Figure 1:
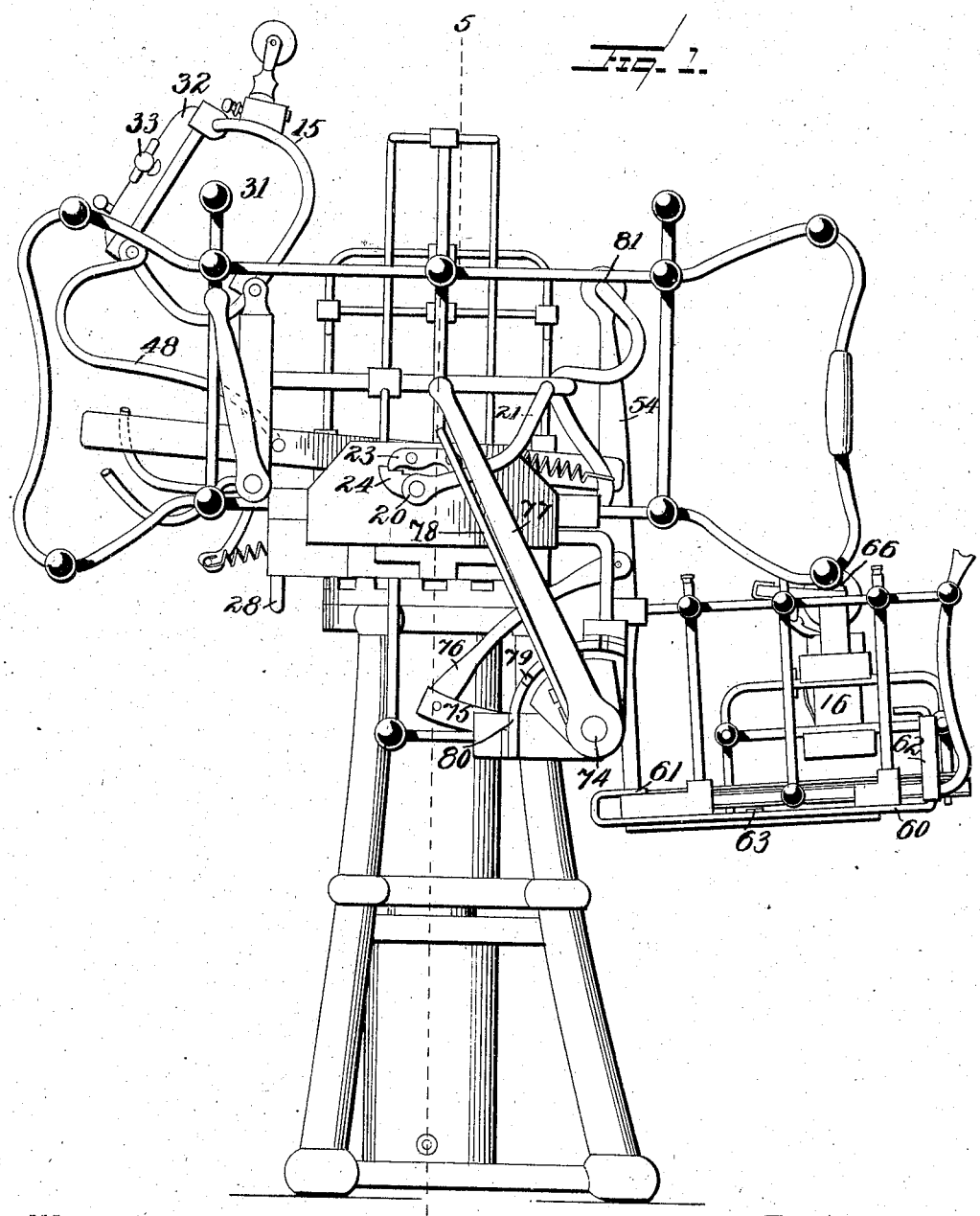
Figure 2:
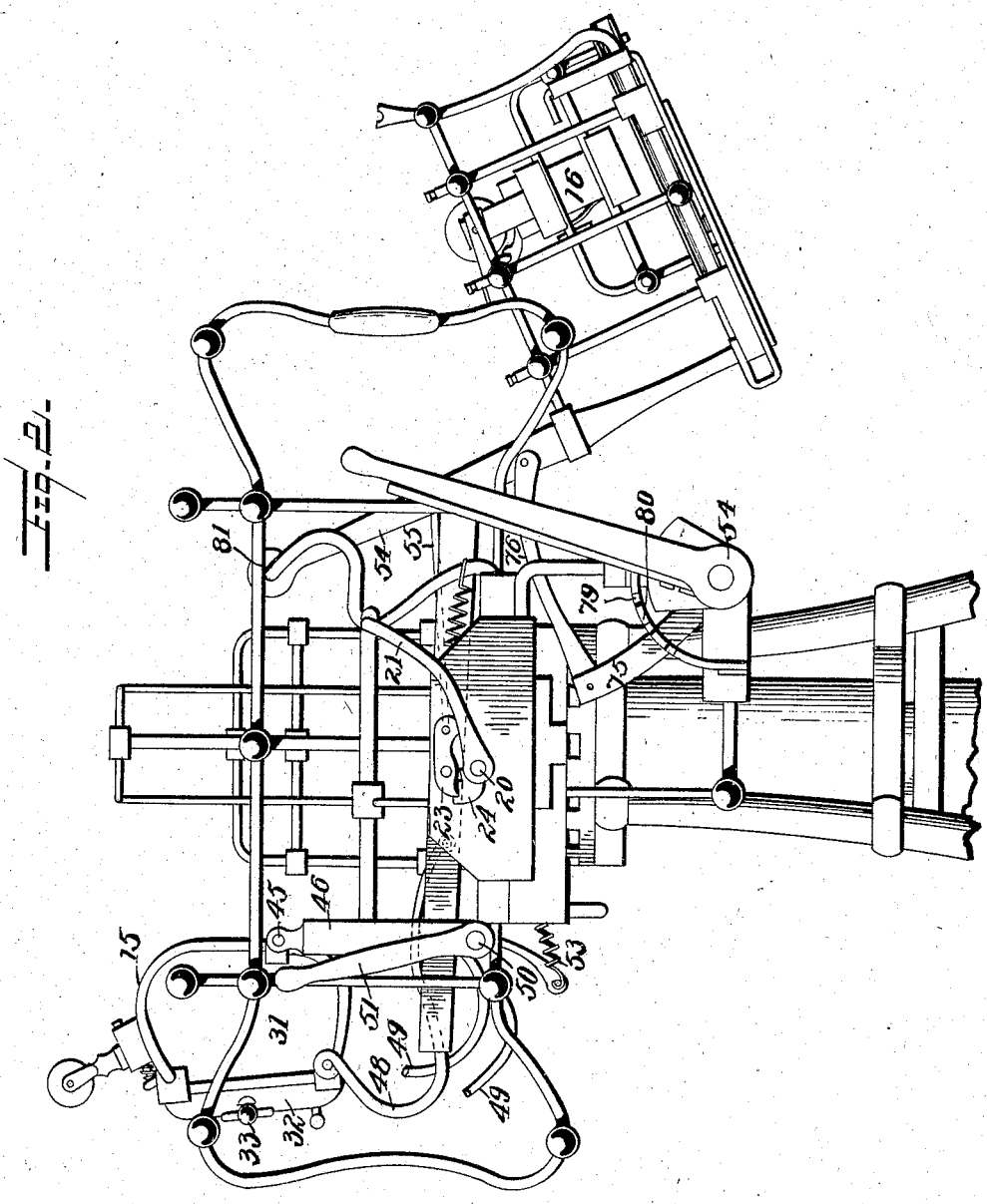
Figure 3:
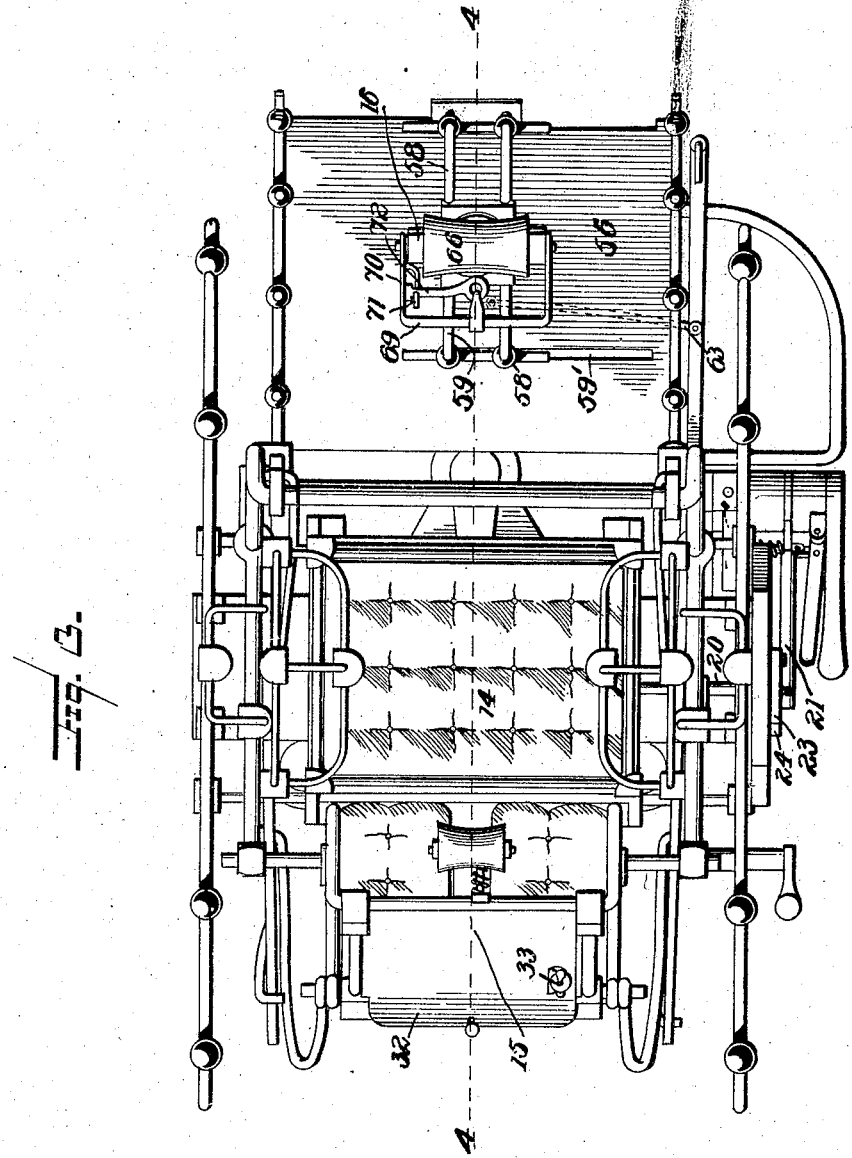
Figure 4:
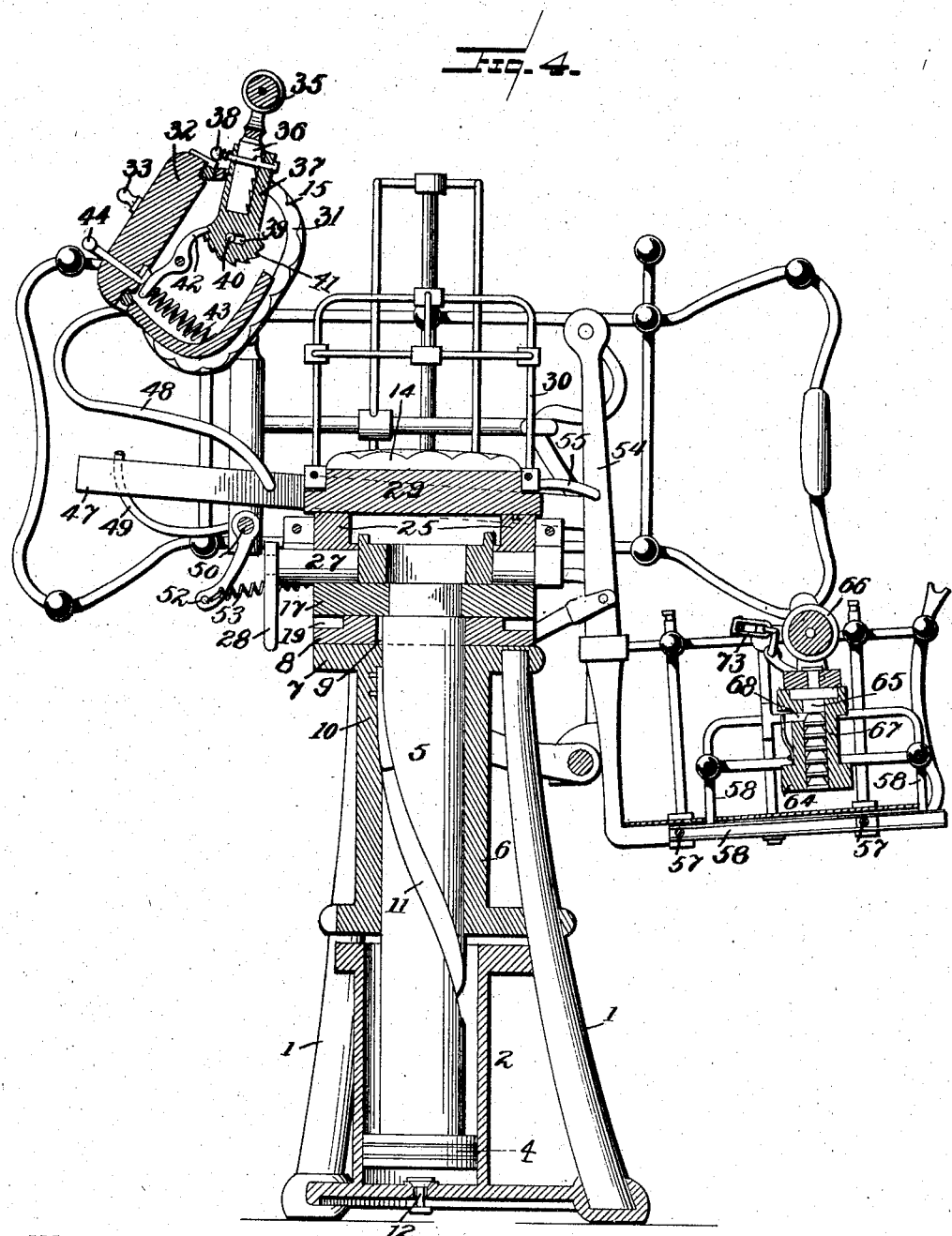

Figure 1 is a side elevation of the chair in its normal position. Fig. 2 is a side elevation in shaving position. Fig. 3 is a top plan of Fig. 1. Fig. 4 is a vertical section on the line 4 4 of Fig. 3. Fig. 5 is a similar section on the line 5 5 of Fig. 1. Fig. 6 is a section on the line 6 6 of Fig. 5. Fig. 7 is a view of the tool-case, and Fig. 8 represents the seat in an elevated position.

The chair proper rests upon the support, which may be, as shown, in the form of a tripod, or it may be cylindrical or conical, as is obvious. Within the space inclosed by the lower portion of the support is a cylinder 2, into which at 3 steam or compressed gas or air is conducted to serve as a motive fluid for raising the chair. A piston 4, Fig. 4, is fitted within the cylinder and is mounted upon a stem 5, which extends upwardly through a guide 6, occupying the upper central portion of the support, and thence projects through the head 7 of the tripod and a disk 8, to the latter of which it is keyed at 9, the base of the chair proper resting pivotally over the end of the stem upon the disk. The inner wall of the cylinder is provided with a rigidly-secured guide 10 or lug which engages a helical groove 11 in the surface of the stem, the object of said helical groove being to afford a gradual and not a sudden descent of the stem 5. In the lower portion of the cylinder a valve 12, controlled by the foot-lever 13, provides for the relief of the fluid-pressure, gas, or steam when the chair is lowered.

When it is desired to elevate the chair, steam or gas or air under pressure from a suitable storage-tank or from a foot-pump is introduced at 3 and the piston rises, imparting a slow rotary movement to the stem and carrying upwardly the disk and the chair resting thereon. To lower the chair, the foot-lever 13 is depressed, the valve 12 opened, and the escape of the fluid permits a reverse movement of the parts.

The framework of the chair consists of metallic intersecting rods so arranged as to form a basket-work construction which is of exceptional strength, while of light weight and appearance. The rods are preferably of polished brass of about five-eighths-inch diameter and at the points of intersection are joined by brass balls. The framework may also, obviously, be nickel-plated or enameled or may even be more or less advantageously made of other material, although, as stated, brass is preferred.

The chair proper comprises the seat portion 14, the head-rest portion 15, and the foot-rest portion 16, the independent and relative adjustments of which portions and the means of effecting the same will be described in turn.

The chair rests upon a rigid base-plate 17, which contains a central opening for the reception of the upper end of the stem 5, forming a pivotal mounting concentric of the disk 8. The plate is provided with an aperture within which a pin 18 is so arranged that in its lowermost position it engages one of the recesses 19, formed in a circle in the upper face of the disk 8, and locks the chair to the disk and against relative rotary movement. A rock-shaft 20, suitably journaled in the frame, carries at one end the operating-lever 21 and at the other end an arm 22, which is connected with the pin 18, whereby the latter may be brought into and out of engagement with the recesses 19, the rock-shaft and its parts being held in the desired adjustment by means of the pawl 23 engaging the teeth of the rack 24. By the arrangement just described the chair can be normally secured against rotary movement or freely revolved at will, and it can be released, so as not to rotate with the disk and the stem as the chair is raised and lowered.

The base-plate 17 has upwardly-projecting lugs or ears 25, within which is journaled a cam 26, carried by a shaft 27, controlled by a lever 28. This cam 26 is journaled beneath the seat, which rests upon the edge of the cam-face 26' and also upon the upwardly-projecting lugs or ears 25. A lever 28, by means of which the cam is operated, is secured to one end of the shaft 27, and by turning said lever the cam-face 26' can be turned upward or downward, thus raising or lowering the seat 29 independently of the rest of the chair. The object of the cam and its position and operation is to enable the seat to be raised or lowered to suit the height of the person sitting thereon, thus accommodating different customers according to their stature, such as a man or a boy. The seat is guided for vertical movement and against lateral displacement by means of the rods 30, which slide in corresponding apertures in the base-plate 17 and frame. These rods 30 fit loosely, and they may be entirely withdrawn and the seat portion removed from the chair, if desired.

The head-rest portion comprises a head-rest support in the form of a case 31, provided with a hinged cover or door 32, closed by a latch 33 and containing compartments 34 for the convenient and safe storage of the operator's tools and serving as a base for the head rest or roll 35, which is carried by a stem 36, provided with ratchet-teeth or notches. This rests within a sleeve 37, Fig. 4, under the control of a spring-actuated pin 38, arranged to engage the notched stem with one end and serving as a push-button to grasp and release the stem 36, by which a longitudinal adjustment of the roll 35 is secured. The sleeve 37 has a transverse and preferably curved slot 39 near the inner end, within which slot passes a pin 40, which is arranged and serves as a fulcrum for the pivotal movement of the sleeve. The inner end of the sleeve is rounded and provided with teeth 41, which are engaged by one arm of the pawl 42 under the influence of the spring 43. A pin 44 serves to actuate the pawl 42 against the tension of the spring, and thus release the sleeve 37. As the roll-bearing stem may be drawn in and out of the sleeve and the sleeve can be moved through an arc of approximately one hundred degrees about the pin 40, it will be seen that an exceedingly wide range of adjustment is thus secured for the head-supporting roll even when the case 31 remains fixed in one position.

The case 31 is supported upon the rods 45, the ends of which are pivotally mounted in standards 46, carried by the base-plate. Side bars 47, lying alongside the seat and having their front ends connected with the foot-rest portion, as will be hereinafter more fully described, are joined intermediate their length by the curved links 48 with the upper rear side of the case 31 in such manner that the raising and lowering of the rear end of the side bars will tip the case forward, thus increasing the range of adjustment of the head-supporting roll 35. This last-described movement is effected through the medium of hooked arms 49, bearing, respectively, upon the upper and lower sides of the rear ends of the two side bars and fixed upon the rock-shaft 50, controlled by the lever 51. An arm 52, fast to the rock-shaft and connected by a spring 53 with a fixed portion of the chair, serves to equalize the forces exerted upon the shaft.

The foot-rest portion is supported from the main frame of the chair by the swinging rods 54, which are connected near their middle with the side bars 47, either directly or by means of the links 55. Across the lower side of the platform extend guide-rods 57, upon which slides a base 58, carrying a frame 59, playing through the slot 59'. A lever 60, fulcrumed at 61 and having an upturned handle 62, is connected by a link 63 with the sliding base 58. By this means the entire base and frame 59 can be withdrawn to one side to leave the central portion of the platform clear as the customer enters and leaves the chair.

The frame 59 is itself provided with horizontally-disposed rods which serve as guide-rods extending forward and backward. These rods support the laterally-extending undercut shoulders of the foot-rest support of slide 64, which forms a sleeve for the reception of the stem 65 of the foot-roll 66. The stem 65 is formed with a number of conical ratchet-teeth 67, which receive the spring-pressed dog 68, whereby the stem is held against downward movement, but may be freely rotated. A foot-rest bar 69 is connected by the side pieces 70 with the axle of the roll and is adjusted into proper position by a hook 71, the deflected shank of which abuts against the side of the roll-stem and whose jaws receive the loose end of a bar 72, which is hinged to a sliding clevis 73, carried by the foot-bar 69.

The chair is thrown from the normal position, as shown in Fig. 1, into the reclining or shaving position, as shown in Fig. 2, by virtue of the connections already described and by means of the mechanism as follows:

A rock-shaft 74 is provided with two arms 75, connected by curved links 76 with the swinging rods 54, which support the horizontal platform 56. This rock-shaft 74 is actuated by a lever 77 and is provided with the usual supplemental lever-rod 78, which carries a dog to engage a series of recesses or teeth 79 in the segment 80, whereby the lever and shaft are held in adjusted position. It will be seen that as the lever 77 is thrown from the position shown in Fig. 1 to that shown in Fig. 2 the links 76 will push the rods 54 forward into an inclined position with the platform and foot-rest swinging upon the pivot at 81. In so doing the side bars 47, connected thereto by the links 55, are drawn forward and, by means of the curved links 48, tilt the case 31 and the head-supporting roll 35 backward to bring the parts of the chair into a proper reclining position. A reversal of the movement will again restore the normal upright position.

While I have illustrated and described an embodiment of my invention after the preferred form and as applied in a barber-chair, it will be evident that many changes of details will be suggested to one skilled in the art which yet come within the spirit of my invention as set out, wherefore I do not desire to be restricted to the particular construction shown nor to the application, as my invention may be utilized, for instance, in dentists' and surgeons' chairs.

Having thus fully disclosed my invention, what I claim as new, and desire to secure by Letters Patent, is—

1. In a barber-chair, a fluid-pressure cylinder, a piston movable within the cylinder, a helical groove formed upon the stem of the piston, a sleeve serving as a guide for the stem and provided with a projection to engage the groove, a disk secured to the stem, and a second disk serving as the base of the chair and supported by the first disk.

2. In a barber-chair, a fluid-pressure cylinder, a helical groove formed upon the stem of the piston, a sleeve serving as a guide for the stem and provided with a projection to engage the groove, a disk keyed adjacent to the upper end of the stem and provided with concentric recesses, a second disk loosely mounted upon the end of the stem in friction contact with the first disk and serving as the base of the chair, and a pin mounted within the second disk and arranged to be brought into and out of engagement with the recesses in the first disk.

3. In a barber-chair, a fluid-pressure cylinder, inlet and outlet valves, means for controlling the same, a piston movable within the cylinder, a helical groove formed upon the stem of the piston, a sleeve serving as a guide for the stem and provided with a projection to engage the groove, a disk keyed adjacent to the upper end of the stem and provided with concentric recesses, a second disk loosely mounted upon the end of the stem in friction contact with the first disk and serving as the base of the chair, a pin mounted within the second disk and arranged to be brought into and out of engagement with the recesses in the first disk, a rock-shaft having one arm operatively connected with the pin, a lever connected with the other end of the shaft, and a pawl arranged to engage a ratchet carried by the shaft.

4. In a barber-chair, a suitable support, a seat-base carried thereby and provided with upwardly-extending lugs, a shaft journaled in the lugs, a cam carried by the shaft, a seat provided with guide-rods slidably mounted in the base, said seat resting upon the cam, and a lever arranged to turn the shaft and thereby shift the position of the cam-surface to raise and lower the seat.

5. In a barber-chair, a platform, a swinging rod mounted upon the frame of the chair and supporting the platform, a head-rest support pivotally mounted upon the frame of the chair, a connection between the head-rest support and the swinging rod, a rock-shaft, an arm carried by the shaft, a link connecting the arm with the swinging rod, a lever for rocking the shaft, and means for holding the lever with the parts in the desired position.

6. In a barber-chair, a platform, a swinging rod mounted upon the frame of the chair and supporting the platform, a head-rest support pivotally mounted upon the frame of the chair, a link connected to the head-rest support, a side bar connecting the link with the swinging rod, a rock-shaft, an arm carried by the shaft, a link connecting the arm with the swinging rod, a lever for rocking the shaft, and means for holding the lever with the parts in the desired position.

7. In a barber-chair, a platform, swinging rods mounted upon the frame of the chair and supporting the platform, a head-rest support pivotally mounted upon the frame of the chair at one side of its axis, links connected to the head-rest support at one side of its pivotal mounting, side bars connecting the links with the swinging rods, a rock-shaft, arms carried by the shaft, links connecting the arms with the swinging rods, a lever for rocking the shaft, and means for holding the lever with the parts in the desired position.

8. In a barber-chair, a platform, swinging rods mounted upon the frame of the chair and supporting the platform, a head-rest support pivotally mounted upon the frame of the chair at one side of its axis, links connected to the head-rest support at one side of its pivotal mounting, side bars connected at one end to the swinging rods and at a point intermediate the length of the bars to the links, a rock-shaft, arms carried by the shaft, links connecting the arms with the swinging rods, a second rock-shaft, arms carried by the second rock-shaft and engaging the otherwise free end of the side bars, levers for rocking the shafts, and means for holding the levers with the parts in the desired position.

9. In a barber-chair, a platform provided with lateral guide-rods, a foot-rest slidably carried by the rods, a lever arranged to shift the position of the foot-rest upon the guides, swinging rods carried by the frame of the chair and supporting the platform, a head-rest support pivotally mounted upon the frame of the chair at one side of its axis and provided with compartments for the reception of tools, a head-rest adjustably mounted in the support, substantially horizontal bars connected with the swinging rods, links connecting the horizontal bars intermediate their length with the head-rest support at one side of its pivotal mounting, a rock-shaft, arms carried by the shaft, links connecting the arms with the swinging rods, a second rock-shaft, arms carried by the second shaft and loosely engaging the upper and lower sides respectively of the horizontal bars, levers for rocking the shafts, and means for holding the levers with the parts in the desired position.

10. In a barber-chair, a fluid-pressure cylinder, a piston movable therein, a disk secured adjacent to the upper end of the stem of the piston, a second disk loosely mounted upon the end of the stem in friction contact with the first disk and serving as a base for the chair, a cam mounted upon the base, a seat mounted for vertical movement and resting upon the cam, and means for shifting the position of the cam-surface and thereby raising and lowering the seat, in combination with a platform provided with lateral guide-rods, a frame arranged to slide upon the guides, a foot-rest support arranged to slide upon the frame, transversely of the guides, a foot-rest carried by a stem adjustably mounted in the support, means for shifting the position of the frame on the guides, means for shifting the support upon the frame, swinging rods carried by the frame of the chair and supporting the platform, a head-rest support pivotally mounted upon the frame of the chair at one side of its axis and provided with compartments, a sleeve pivoted in the support, a head-rest adjustably mounted in the sleeve, substantially horizontal bars connected with the swinging rods, links connecting the horizontal bars intermediate their lengths with the head-rest support at one side of its pivotal mounting, a rock-shaft, arms carried thereby and connected with the swinging rods, a second rock-shaft, arms carried by the second shaft and loosely engaging the otherwise free ends of the horizontal bars, means for rocking the shafts, and means for holding the parts in the desired adjusted position.

In testimony whereof I hereunto affix my signature in presence of two witnesses.

ROBERT STITTS.

Witnesses:
Wm. J. Horan,
L. E. Allyne.